United States Patent
Ristow

[11] 3,721,010
[45] March 20, 1973

[54] DIAL INDICATOR GAGE

[76] Inventor: Harold E. Ristow, 1332 W. 186 Street, Gardena, Calif. 90247

[22] Filed: Feb. 8, 1971

[21] Appl. No.: 113,125

Related U.S. Application Data

[63] Continuation-in-part of Ser. No. 817,438, April 18, 1969, abandoned.

[52] U.S. Cl. ........................... 33/172 R, 116/129 R
[51] Int. Cl. ................................................ G01b 5/00
[58] Field of Search ............ 33/172A, 169B, 147A-F 33/172R, 33/148 A, 148 E; 116/129 R, 129 F

[56] References Cited

UNITED STATES PATENTS

| 1,299,179 | 4/1919 | Harcos | 33/148 E |
| 1,583,355 | 5/1926 | Kottenbach | 116/129 R |
| 2,137,194 | 11/1938 | Weber | 116/129 R |
| 2,401,029 | 5/1946 | Thompson | 116/129 R |
| 2,832,151 | 4/1958 | Emery | 33/172 A |

*Primary Examiner*—William D. Martin, Jr.
*Attorney*—Howard L. Johnson

[57] ABSTRACT

Gage to measure depth of bore or thickness of workpiece, etc. Diametrically projecting, spring-urged contact stem transverses cylindrical housing which has rotatable inner sleeve with internal ring gear. Rack teeth on stem engaged by one or more intermediate gears which drive ring gear and turn sleeve which carries dial indicator relative to overlying stationary pointer, the zero setting of which can be changed however to indicate desired standard for workpiece. Gear train and diametrically large dial face produce very high accuracy.

8 Claims, 9 Drawing Figures

PATENTED MAR 20 1973

INVENTOR.
HAROLD E. RISTOW
BY
*Howard L. Johnson*
ATTORNEY

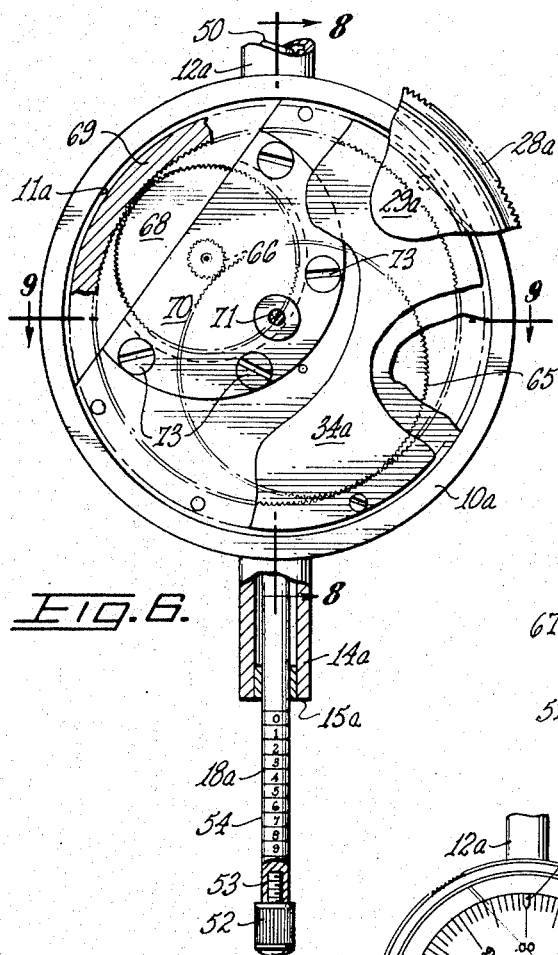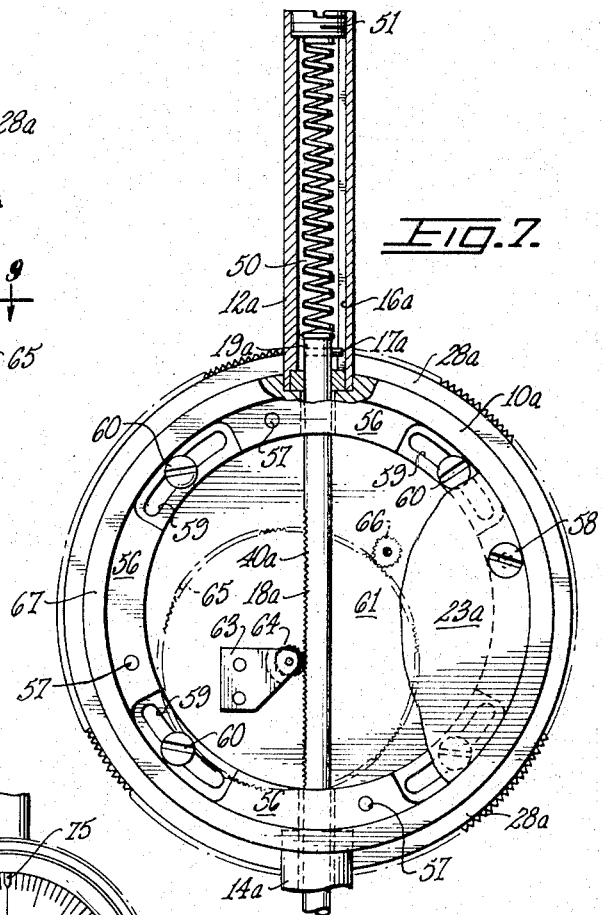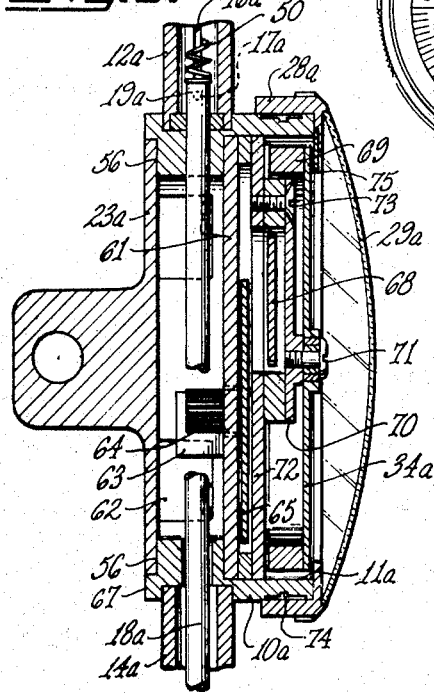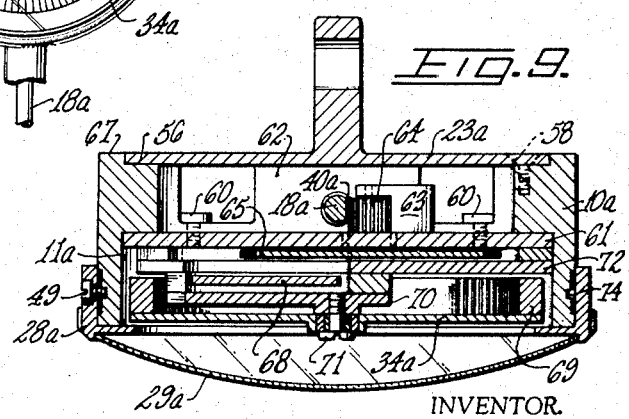
INVENTOR.
HAROLD E. RISTOW

DIAL INDICATOR GAGE

This is a continuation-in-part of Ser. No. 817,438, filed Apr. 18, 1969, now abandoned.

This invention provides a simple and accurate gage mechanism, such as can be used in a thickness gage or in a caliper, wherein the reciprocable contact member is a rack bar which is diametrically mounted so as to project through (at least one side of) an annular housing drum. One end of the drum provides an annular guideway for a rotatable sleeve which has internal teeth forming a ring gear, and the sleeve fixedly carries an indicator dial which thus can be as large or larger than the drum so as to be relatively minutely calibrated.

Within the drum, gear means engaging both the rack bar and the ring gear, drive the latter (together with its dial) as the contact end of the rack bar stem moves toward or away from abutment with a workpiece. Within the housing drum, the gear track of the ring gear, and the rack bar portion of the reciprocable stem are laterally offset (that is, axially to the drum) and the intermediate gear means is of sufficient width to span or engage them both. In a penetration or thickness gage, an abutment surface is spaced from the outer perimeter of the drum so as to be locatable against one surface of a block or sheet of material of which it is desired to measure the thickness. A compression spring normally holds the contact end of the rack bar or stem, extended so that it is then automatically compressed or retracted by pressing it against the workpiece.

In the drawings, which show presently preferred embodiments

FIG. 5 is a front elevational view of another embodiment.

FIG. 6 is an enlarged view of the FIG. 5 form, with the dial face removed and other parts broken away or in vertical section.

FIG. 7 is a corresponding view from the rear, with the rear closure plate removed and the upper tube shown in axial section.

FIG. 8 is a vertical axial section along the line 8—8 of FIG. 6.

FIG. 9 is a transverse section along the line 9—9 of FIG. 6.

Figure 1:
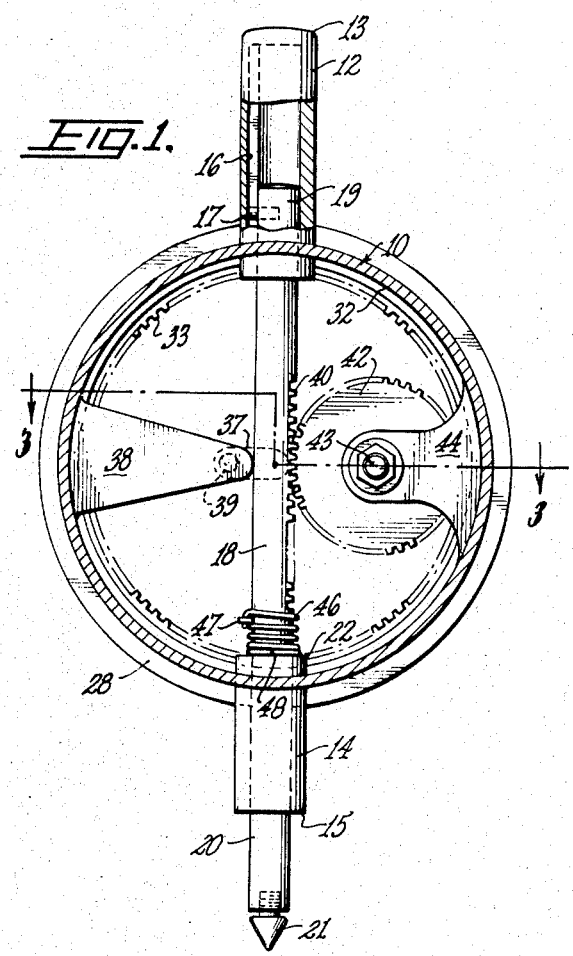
FIG. 1 is a vertical section taken through one form of dial indicator along the line 1—1 of FIG. 2, with parts broken away.
Figure 2:
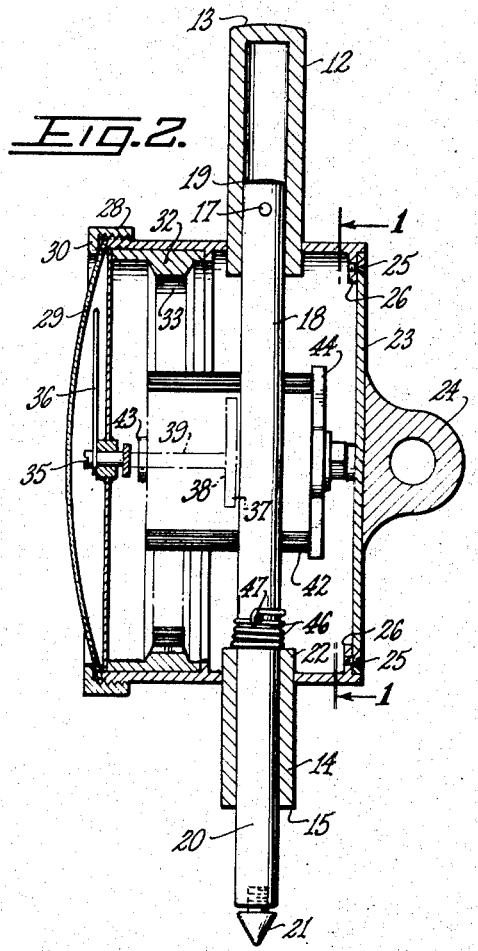
FIG. 2 is an axial vertical section taken at right angle to FIG. 1, with parts in elevation.
Figure 3:
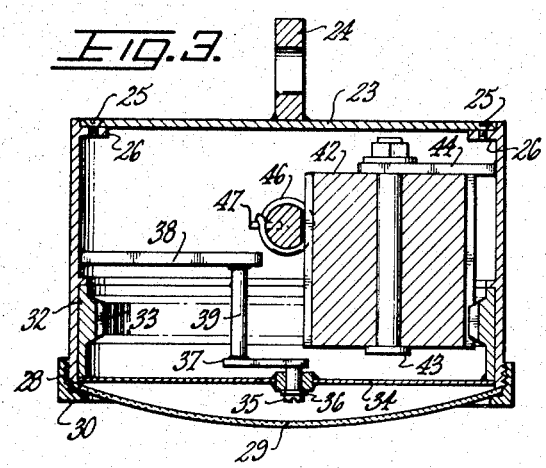
FIG. 3 is a staggered, transverse sectional view taken along the line 3—3 of FIG. 1, with some structures seen in elevation.
Figure 4:
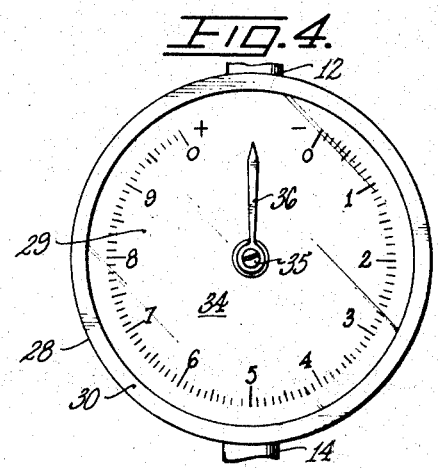
FIG. 4 is a face view of the rotatable dial and fixed pointer.

In the form of FIGS. 1-4, there is provided a generally annular housing shell or drum 10 from which a pair of diametrically aligned tubes 12, 14 extend outward in opposite directions, the upper one being closed at its top 13, and the lower one being open at both ends with its lower end being formed with an externally flat, abutment edge 15 adapted to be placed against a work surface which is to be measured. The upper tube 12 is formed with a longitudinal slot or keyway 16 along its inner face, which slot slidingly receives a transverse guide pin 17 of a longitudinally slidable stem 18, which stem diametrically traverses the housing 10 with its upper, keyed end 19 retained in the upper tube 12 and its lower length 20 completely traversing the lower tube 14 and projecting therebeyond. A hardened, conic end 21 is thus disposed to contact a lower worksurface such as the bottom of a bore when the depth of the bore (from the level of surface 15) is to be measured.

The back of the housing shell 10 is closed with a plate 23 having a projecting attachment bracket 24, with the closure plate 23 secured by screws 25 to several inward-directed ears 26. The front end of the housing 10 is closed by a threaded cap 28 which retains a transparent window 29 within its inturned, peripheral flange 30.

Rotatably disposed within the forward part 11 of the shell, is a sleeve 32 formed with a threaded track or ring gear 33 about its inner periphery, the forward edge of the sleeve carrying a face-calibrated dial 34. The dial is centrally apertured and is journalled on an axial stud 35 which carries a fixed pointer 36 in front of the dial, the stud being supported within the housing from an inner bracket arm 38 by means of intermediate arms 37, 39.

One longitudinal side of the portion of the stem 18 which is located within the housing 10 is formed with rack teeth 40 which are engaged by an intermediate gear 42 which simultaneously engages the internal gear 33 of the sleeve. The gear 42 is mounted on a shaft 43 which is suspended within the housing shell by a bracket arm 44. Thus as the stem moves lengthwise, its rack teeth 40 turn the gear 42 which rotates the sleeve 32 (and dial 34) in the annular guideway provided by the cylindrical housing 10.

A compression spring 46 is disposed about the stem 18 and attached thereto at 47, with its lower, free end 48 in sliding abutment with the upper edge 22 of the tube 14. Since the coil 46 resists axial compacting, it normally disposes the lower portion 20 of the stem 18 projecting beyond the bottom end 15 of the lower housing tube 14. In use, when the contact end 21 is pressed against one test surface (e.g. bottom of a bore) and the abutment edge 15 at the same time is on an adjacent test surface (e.g. outer edge of the bore), the consequent rotational position of the dial shows the distance between these two surfaces (e.g. the measured depth of the bore). In comparison, when the contact end 21 is completely retracted within the housing tube 14, the zero position of the dial 34 is overlaid by the fixed pointer 36. It will be seen that this construction eliminates a vibrating or oscillating pointer and provides a sturdier read-out setting for a finely calibrated dial.

The embodiment of FIGS. 5-9 similarly provides an annular shell 10a having a rear closure plate 23a and a detachable, flanged face cap 28a held by set screws 49, which cap positions a window 29a overlying the calibrated, rotatable dial 34a. The operative rack bar or stem 18a which diametrically transects the shell, has its keyed top end 19a lodged in an upper, projecting tube 12a with a guide pin 17a slidable in the longitudinal keyway 16a. Above the stem, a helical compression spring 50 is disposed in the cavity of the tube 12a, dependently bearing on the end 19a of the stem and at its other end abutting the underface of a threaded cap 51 which is mounted in the upper end of the tube, its slotted face disposed flush with the top edge thereof.

The lower portion of the stem 18a traverses a diametrically-aligned open-ended lower tube 14a and carries on its free end a work contact tip 52 which is attached to an axial socket of the stem by a threaded shaft 53. An exposable stem length 54 which may be projected below the work abutment edge 15a of the tube, is calibrated in axial segments each corresponding to one complete rotation of the dial 34a.

The rear portion 62 of the cavity of the housing shell 10a is formed with arcuate, inward projecting shoulders 56 (FIG. 7) which are also recessed inward from the rear face 67, the shoulders having threaded sockets 57 for reception of countersunk screws 58 used to attach the rear closure plate 23a which is thus positioned flush with the rear face 67 of the shell. Between the shoulders are arcuate slots 59 which receive retention screws 60 for holding a diametric mounting plate 61 which thus separates the forward compartment 11a from the rear cavity 62. A rear-projecting post 63 on the plate 61 journals a pinion 64 which engages the rack teeth 40a of the stem 18a. The pinion extends through an aperture of the plate 61, adjacent the front face of which it carries a toothed wheel or gear 65. The latter engages a pinion 66 (FIG. 7) which revolves jointly with a larger gear 68, and the latter in turn meshes with a cup-shaped ring gear 69 or sleeve, the forward face of which presents the calibrated dial 34a. The ring gear 69 is secured to a transverse mounting plate 70 by a central bearing screw 71. The bracket plate 70 is spaced from and secured to a parallel mounting plate 72 by screws 73. Thus the large gear 68 is located between the mounting plates 70 and 72, and the large gear 65 is located between the mounting plates 72 and 61. The pinion 66 is carried by the gear 68 and meshes with the gear 65. The latter carries the pinion 64 which meshes with the rack teeth 40a of the stem. Accordingly, a small longitudinal movement of the stem 18a is transmitted through such gear train, without backlash, to effect a much greater movement of the dial 34a, a short segment 54 of the stem corresponding to a complete revolution of the dial.

The set screws 49 which hold the face cap 28a can ride loosely in the channel 74 (FIG. 9) of the annular guideway so that the cap with its fixed pointer 75 can be set at any rotational position which may correspond to the desired standard or zero deviation for a particular job. When the indicator gage is subsequently used to test successive workpieces for this measurement, their deviation from such standard will be shown in each instance by the difference of the dial position from the set zero which indicates the desired measurement. Thus the pointer 75 can be set to indicate zero when the stem 18a has reached the desired depth of a bore; when this depth varies when tested on successive workpieces, the dial will indicate the amount of variance (plus or minus) from the set zero position. The multiplication of stem movement provided by the gear train in its transmission to the ring gear, is even further magnified by increasing the diameter of the dial face 34a, so that a very great accuracy can be obtained; and the result is more readily readable by the elimination of an oscillating pointer.

I claim:

1. A measuring gage of the character described, comprising in combination:
   a housing structure providing a generally annular guideway,
   a stem reciprocably mounted in said structure and disposed generally diametrically to said guideway, with a work-contact end selectively projectable therebeyond, a length of said stem which is encompassed by said housing having rack teeth,
   a sleeve rotatably disposed about said annular guideway, the sleeve forming a ring gear and fixedly carrying an indicator dial,
   and intermediate gear means operatively connecting the rack teeth of said stem with said ring gear, whereby longitudinal movement of the stem serves to rotate said indicator dial.

2. The measuring gage of claim 1 which additionally has resilient means for normally holding the work-contact end of said stem in projected position.

3. The measuring gage of claim 1 wherein said rotatable sleeve and dial are journalled on an axially disposed shaft within the housing structure, which shaft fixedly supports a pointer alignable with said indicator dial.

4. The measuring gage of claim 1 wherein said housing structure carries a pointer selectively rotatable concentric to said indicator dial whereby the pointer can be set at any desired zero position corresponding to a standard used for comparison with a workpiece.

5. The measuring gage of claim 1 wherein said intermediate gear means consists of a single gear disposed within said housing and mutually engaging the rack teeth and ring gear, which rack teeth and ring gear are axially separated relative to said housing.

6. The measuring gage of claim 1 wherein said intermediate gear means comprise a gear train disposed within said housing between the rack teeth and ring gear and adapted to multiply the linear movement of the stem in transmitting it to the annular movement of the ring gear and indicator dial.

7. The measuring gage of claim 6 wherein said stem carries indicia for indicating each corresponding complete rotation of the indicator dial.

8. The measuring gage of claim 7 wherein said housing structure carries a pointer selectively rotatable concentric to said indicator dial, whereby the pointer can be set at any desired zero position corresponding to a standard used for comparison with a workpiece.

* * * * *